United States Patent [19]

Illy

[11] Patent Number: 4,555,894
[45] Date of Patent: Dec. 3, 1985

[54] APPARATUS FOR MAKING STRIPS OF COHERENT PACKETS CONTAINING GROUND COFFEE OR THE LIKE

[75] Inventor: Ernesto Illy, Trieste, Italy

[73] Assignee: Illycaffé S.p.A., Trieste, Italy

[21] Appl. No.: 660,919

[22] Filed: Oct. 15, 1984

[30] Foreign Application Priority Data

Oct. 18, 1983 [IT] Italy ................................ 23345 A/83

[51] Int. Cl.⁴ ............................................. B65B 1/24
[52] U.S. Cl. ......................................... 53/528; 53/559
[58] Field of Search ................. 53/528, 527, 559, 436, 53/439, 453, 553

[56] References Cited

U.S. PATENT DOCUMENTS

| | | | |
|---|---|---|---|
| 2,731,777 | 1/1956 | Wollersheim | 53/528 X |
| 3,129,545 | 4/1964 | Sloan et al. | 53/559 X |
| 3,186,137 | 6/1965 | Eitzen . | |
| 3,186,139 | 6/1965 | Clauss | 53/559 X |
| 3,186,141 | 6/1965 | Zimmermann | 53/559 |
| 3,293,042 | 12/1966 | Eitzen . | |
| 3,323,273 | 6/1967 | Lee et al. | 53/528 X |
| 3,347,011 | 10/1967 | Lovas et al. | 53/559 X |
| 3,477,562 | 11/1969 | Allen et al. | 53/527 X |
| 3,668,820 | 6/1972 | Parvin et al. | 53/528 X |
| 3,971,192 | 7/1976 | Soukup et al. | 53/559 |
| 4,353,293 | 10/1982 | Illy . | |
| 4,429,623 | 2/1984 | Illy . | |

Primary Examiner—Horace M. Culver
Attorney, Agent, or Firm—Peter K. Kontler

[57] ABSTRACT

A strip of coherent packets of compacted batches of ground coffee between two overlapping webs of water-permeable material is formed along the upper reach of an endless conveyor with plates having supporting surfaces facing upwardly during travel along the upper reach and provided with recesses which communicate with a suction generating device. The first web is deposited onto the supporting surfaces of successive plates at a first station, followed by deformation of the web at a second station to form therein pockets which extend into the respective recesses and receive batches containing metered quantities of ground coffee at a third station. The batches are compacted in two stages to form cakes from which loose particles are sucked up by a nozzle before the second web is placed over the first web and the cakes. The two webs are then bonded to each other around the respective cakes, and the resulting packets are subjected to a quality control before the continuous strip of coherent packets is subdivided into lengths each of which contains a selected number of packets. The second compacting stage involves rotation of a tool relative to the batch therebelow so that the underside of the tool is free of particles of ground coffee when it is lifted above and away from the thus obtained cake.

20 Claims, 10 Drawing Figures

APPARATUS FOR MAKING STRIPS OF COHERENT PACKETS CONTAINING GROUND COFFEE OR THE LIKE

CROSS-REFERENCE TO RELATED CASES

Machines which can be used for the brewing of coffee from packets or pods of the type produced in the apparatus of the present invention are disclosed, for example, in commonly owned U.S. Pat. Nos. 4,353,293 and 4,429,623 and in commonly owned copending patent application Ser. No. 491,065 filed May 3, 1983.

BACKGROUND OF THE INVENTION

The present invention relates to improvements in apparatus for making packets or pods containing metered quantities of flowable solid material, particularly ground coffee, between two webs at least one of which contains liquid-permeable material. More particularly, the invention relates to improvements in making a strip of coherent packets or pods each of which contains a batch of a metered quantity of flowable solid material between two webs which are bonded together around the batches, e.g., in response to the application of heat and/or pressure. Such strips are often used in certain automatic beverage dispensing machines.

U.S. Pat. Nos. 3,186,137 and 3,293,042 to Eitzen disclose apparatus for making coherent packets which contain batches of ground coffee. The patented apparatus employ two discrete endless closed-link link chains which are mounted in and are movable in vertical planes. Each chain includes a number of plates which serve as supports for a first web of water-permeable material which, in turn, supports batches of ground coffee. The batches are thereupon compacted prior to being overlapped by a second web which is bonded to the first web around each condensed batch. The batches are normally flat disc-shaped accumulations of ground coffee and form a row in the resulting strip of coherent packets. Suitable means are provided for feeding the first web, the batches and the second web. A drawback of these patented apparatus is that the dimensions and weights of successively formed packets can fluctuate within a rather wide range and also that the batches are not compacted, or are not likely to be compacted, to the same extent.

U.S. Pat. No. 3,186,139 to Claus discloses a modified apparatus which also employs a closed-link chain moving in a horizontal plane and having a series of pairwise arranged plates. The lower plate of each pair has a recess serving to receive one-half of a batch of ground coffee particles. The upper plate of each pair is connected to the respective lower plate by a hinge and has an opening for the passage of various tools which are mounted on a mobile carrier and admit the batches and thereupon treat the batches prior to bonding of the two webs to one another. The lower plates of neighboring pairs of plates are articulately connected to each other by hinges extending transversely of the chain and the latter has an elongated upper run extending along several stations at which the conversion of the two webs and of batches of ground coffee into a succession of coherent packets takes place. The first web is acted upon by a shaping or molding tool which makes in its upper side a shallow pocket for the reception of one-half of a batch, the batches are thereupon compressed, the upper web is applied over the lower web and over the compressed batches, the two webs are bonded to each other around each compressed batch, and the thus obtained strip is perforated along one of its marginal portions.

The just described patented apparatus exhibits the drawback that the metering of batches is not entirely satisfactory. Moreover, if the compacting does not result in conversion of the entire batch into a cake of coherent particles of ground coffee, loose particles are likely to accumulate at the exterior of the second web to detract from the appearance of the packets and to interfere with the bonding of the webs to one another. Still further, the patented apparatus is bulky and its output is relatively low since a certain portion of each cycle or certain intervals between successive cycles, must be devoted to cleaning. Last but not least, the operation of the mobile carrier for the tools is not satisfactory because the carrier is not adequately guided for movement toward and away from various processing stations.

OBJECTS AND SUMMARY OF THE INVENTION

An object of the invention is to provide a novel and improved apparatus which can turn out packets or pods of ground coffee or the like with a heretofore unmatched degree of accuracy and reproducibility, which is of compact design, which can make packets containing larger or smaller quantities of flowable solid material, and which can turn out larger numbers of packets per unit of time than the aforedescribed and other conventional apparatus.

Another object of the invention is to provide the apparatus with novel and improved means for transporting the webs and the batches of ground coffee or other flowable solid material, for predictably compacting the batches in such a way that the solid particulate material is not likely to contaminate the apparatus and/or its parts, and for ensuring predictable delivery of accurately metered quantities of flowable solid material to the transporting means ahead of the compacting or densifying station or stations.

A further object of the invention is to provide a novel and improved method of making a continuous strip of coherent packets of ground coffee or other flowable solid material.

An additional object of the invention is to provide a novel and improved strip of coherent packets of ground coffee or the like.

Another object of the invention is to provide an apparatus which can detect, and effect the segregation of, unsatisfactory packets or constituents of packets, which can be rapidly and automatically converted for the making of different types of packets, and which requires a minimum of attention when in actual use.

An additional object of the invention is to provide novel and improved compacting or densifying means for use in an apparatus of the above outlined character.

A further object of the invention is to provide an apparatus which can turn out short or long series of identical packets for use in automatic coffee brewing or other types of beverage preparing and dispensing machines.

Another object of the invention is to provide the apparatus with novel and improved means for intermittently advancing the webs and the batches along a preselected path for convenient treatment of such webs and batches by an assortment of suitable instrumentalities.

The invention is embodied in an apparatus for making a strip of coherent pods or packets of flowable solid material, particularly ground and roasted coffee, between overlapping first and second elongated webs at least one of which includes a liquid-permeable material. The apparatus comprises a conveyor (preferably an endless chain conveyor) including a series of mobile plates having supporting surfaces, means for intermittently advancing the conveyor in a predetermined direction (preferably in a vertical plane) and along a predetermined path having a section (preferably the horizontal upper reach or stretch of the endless chain conveyor) wherein the supporting surfaces of the plates face upwardly, means for depositing successive increments of the first web on the supporting surfaces of successive plates in a first portion of the section, means for feeding batches of flowable solid material onto the first web in a second portion of the section downstream of the first portion (as considered in the direction of advancement of the conveyor) during the intervals of dwell of the conveyor so that each batch is disposed above one of the supporting surfaces, means for densifying the batches in a third portion of the section downstream of the second portion during the intervals of dwell of the conveyor including at least one rotary compacting tool, adjustable means for biasing the tool from above against the batch in the third portion of the section with a variable force and means for rotating the tool while it is biased against the batch in the third portion of the section, means for depositing successive increments of the second web onto the first web in a fourth portion of the section downstream of the third portion so that the second web overlies the batches on the first web, and means for bonding the first and second webs to each other around successive batches in a fifth portion of the section downstream of the fourth portion.

The rotating means of the tool of the densifying means preferably includes an adjustable torque transmitting device (e.g., a rack-and-pinion drive) which can be arranged to transmit to the tool a progressively decreasing torque in response to decreasing force which the biasing means applies to the tool.

The webs preferably contain heat-sealable material (such as a suitable synthetic thermoplastic substance), and the bonding means then includes means for applying heat to selected portions of the webs in the fifth portion of the section. The heat applying means can comprise a welding member having raised portions serving to bond selected portions of the two webs to each other. Such apparatus can further comprise mobile carrier means for intermittently raising and lowering the heat applying means in synchronism with the operation of means for advancing the conveyor. A universal joint is preferably interposed between the carrier means and the heat applying means.

The tool is preferably arranged to condense successive batches of flowable solid material into cakes of coherent solid particles and the apparatus preferably further comprises means for gathering those solid particles on successive plates which do not adhere to the respective cakes. Such gathering means is preferably adjacent to a sixth portion of the section between the third and fourth portions, i.e., downstream of the densifying means but upstream of the location where successive increments of the second web are caused to overlie the first web and the cakes of compacted solid material thereon. The gathering means can comprise a nozzle whose intake is adjacent to the sixth portion of the section and suction generating means serving to draw through the intake a current of air as well as non-adherent particles of successive converted batches.

The apparatus can further comprise signal generating detector means for monitoring the quality of successive compacted batches. The detector means is preferably located in a portion of the section downstream of the fifth portion and is arranged to monitor the shape of those portions of the second web which overlie compacted batches. Means can be provided to apply indicia to at least one of the webs in the region of a detected defective batch.

The feeding means preferably comprises a reservoir or another suitable source of flowable solid material, level detector means for monitoring the supply of material in the source, and means (e.g., an intermittently operable coffee grinding machine) for admitting additional material when the supply of material in the source is depleted below a predetermined value. The feeding means further comprises a metering device which receives flowable solid material from the source and means for conveying batches from the metering device onto the first web in the second portion of the section. The metering device is preferably adjustable (e.g., by a micrometer screw) to thereby vary the quantity of material in the batches. The feeding means preferably also comprises means for deionizing the particles of the batches before such particles reach the second portion of the section. This ensures that the electrostatic charges (if any) of the solid particles are neutralized so that the particles do not tend to adhere to the metering means and/or to the means for conveying metered quantities (batches) of flowable solid material from the metering means to the upper side of the first web.

The plates of the conveyor are movable relative to each other, as considered in the direction of advancement of the conveyor, and the apparatus preferably further comprises means for moving the plates along the aforementioned section of the path nearer to each other in response to each stoppage of the conveyor. This contributes to predictability of the dimensions of the packets. The means for moving the plates nearer to each other can comprise a brake for the conveyor or for the means for advancing the conveyor.

The conveyor preferably further comprises additional (outer) plates, one for each mobile plate, and means for articulately connecting the additional plates to the respective mobile plates so that the additional plates can move to and from positions of overlap with the supporting surfaces of the mobile plates.

The densifying means can comprise a second tool which is mounted on the carrier means ahead of the rotary tool, as considered in the direction of movement of the conveyor, and serves to effect preliminary compacting of successive batches.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
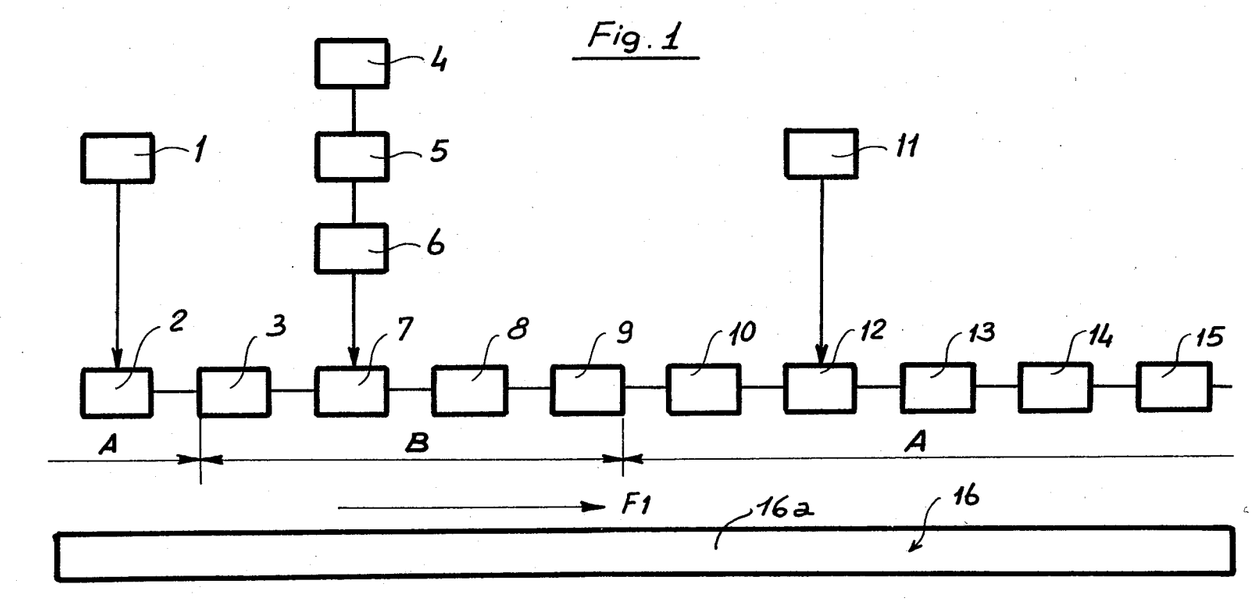
FIG. 1 is a diagrammatic view of the apparatus showing the sequence of operations which are preformed in converting two webs of water-permeable material and batches of ground coffee into strips of coherent packets or pods.

Referring first to FIG. 1, there is shown diagrammatically the sequence of making a continuous strip 255 (FIG. 3) of coherent packets or pods 155 (FIG. 3) containing ground coffee. The reference character 1 denotes a source of supply of a first web 55 (see also FIG. 3) which is made of or which contains a water-permeable material and is to constitute one layer of the continuous strip 255. The source 1 may constitute or comprise a reel or bobbin of convoluted web 55 and means for paying out the web at a controlled rate, preferably along a meandering path as shown in FIG. 3. The exact construction of the means (e.g., a pair of intermittently driven rolls defining a nip for the passage of the web 55) for paying out the web forms no part of the present invention. Successive increments of the web 55 reach a first portion of an elongated horizontal section of an endless path which is defined by an endless chain conveyor 16 at a location 2. The just mentioned section of the endless path is defined by the upper reach or stretch 16a of the conveyor 16 the details of which can be seen in FIGS. 2 and 3. This conveyor comprises a succession of pairwise arranged inner plates 21 and outer plates 22. The inner plates 21 of neighboring pairs 20 are secured to each other by hinges 23 which extend transversely of the direction (arrow F1 in FIG. 1) of movement of the upper reach 16a. The outer plates 22 are articulately connected to the respective inner plates 21 by hinges 26 which extend in parallelism with the direction of movement of the upper reach 16a. At the station 3 of FIG. 1, a male deforming member 45 (shown in FIG. 3) makes in the adjacent portion of the web 55 a depression or pocket by causing the material of the web 55 to penetrate into a circular recess 24 in the upper (supporting) surface 21a of the respective inner plate 21. The corresponding portion of the material of the web 55 is then attracted to the concave surface bounding the respective recess 24 in the supporting surface 21a by a suction generating device which draws air from the recess 24 by way of suction ports 25 machined into the inner plate 21. The resulting pocket in the upper side of the web 55 is ready to receive a portion of an accurately metered batch of ground coffee at a station 7 (second portion of the path section defined by the upper reach of the conveyor 16). The means for feeding batches of ground coffee to the station 7 comprises a reservoir 4 which constitutes a source of ground coffee, an adjustable metering or batch forming device 5 which receives ground coffee from the reservoir 4, and a conveying system 6 which delivers successive batches into successive pockets of the web 55, always into the pocket of the web portion on that inner plate 21 which is located at the station 7. The conveyor 16 is driven intermittently and the delivery of batches at the station 7 takes place during the intervals of dwell of the conveyor 16.

The station 7 is followed by a two-stage densifying or compacting station 8, 9 in a third portion of the path section defined by the upper reach 16a of the conveyor 16. At the station 8, the adjacent batch of ground coffee is compacted or condensed by a first vertically reciprocable compacting tool 47 (see FIG. 3) which is movable up and down with and/or relative to a vertically reciprocable elongated bar-shaped carrier 40. A second compacting or condensing tool 48 at the station 9 subjects the precompacted batch to a final compacting action so that the batch constitutes a cake 154 of coherent particles having a predetermined size and shape.

The station 9 is followed by a station 10 where a gathering device including a nozzle 49 (FIG. 3) sucks up all such loose particles of ground coffee which failed to adhere to the respective cake 154 as a result of compacting action of the tool 48 at the station 9. The position and dimensions of the nozzle 49 are selected in such a way that the inflowing air gathers all loose particles on as well as around the cake 154 at the station 10.

The station 10 is followed by a station 12 (the fourth portion of the path section defined by the upper reach 16a of the conveyor 16) where the first web 55 and the cakes 154 of compacted batches of ground coffee are overlapped by a second or outer web 59 (FIG. 3) made of or containing a water-permeable material and being drawn from a suitable source 11 (e.g., a bobbin or reel and means for advancing increments of the convoluted web 59 toward the aforementioned section of the path which is defined by the conveyor 16). The web 59 which extends between the source 11 and the station 12 is preferably caused to advance along a meandering path which is shown in FIG. 3.

The station 12 is followed by a station 13 (the fifth portion of the path section defined by the upper reach 16a of the conveyor 16) where a thermowelding (heat applying) device 50 (shown in FIG. 3) bonds selected portions of the webs 55 and 59 to each other to convert such webs and the cakes 154 of ground coffee therebetween into a succession of coherent packets 155. The arrangement is preferably such that the webs 55, 59 are bonded to each other all the way around the respective cakes 154 of ground coffee.

The station 13 is followed by a station 14 where the quality of the strip 255 of coherent packets 155 is monitored by a detector or sensor 51 (FIG. 3) which generates signals denoting the quality of the monitored packets 155 and includes or cooperates with means for encoding relevant information into the respective packets or into the strip of such packets at a preselected distance from each defective packet. The information may be in encoded form, e.g., in the form of notches which are machined into the one or the other marginal portion of the strip 255 so that they can be readily detected by a suitable decoding device, e.g., a device of the type often used in photographic processing laboratories to decode information denoting the quality and/or other characteristics of film frames on a strip of exposed and developed or still undeveloped photographic film.

The station 14 is followed by a station 15 where the continuous strip 255 of coherent packets 155 is subdivided into shorter strips or lengths each of which contains a predetermined number of packets. Such shorter strips are ready to be used in an automatic coffee brewing machine. The severing instrumentalities which are located at the station 15 are shown at 52 and 53 in the right-hand portion of FIG. 3.

The conveyor 16 is mounted in a vertical plane and its upper reach 16a is but need not be horizontal or substantially horizontal. As mentioned above, the conveyor 16 is driven intermittently so that its upper reach advances in the direction of arrow F1 in order to move successive pairs 20 of inner and outer plates 21, 22 from station to station at a frequency which is determined by the slowest unit that acts upon the webs 55, 59 and/or batches and/or cakes 154 and/or strip 255. The reference characters A denote in FIG. those portions of the upper reach 16a of the conveyor 16 where the outer plates 22 are pivoted away from the respective lower plates 21 (see also FIG. 3), and the reference character B denotes the region where the outer plates 22 overlie the respective inner plates 21. In the region B, the first web 55 is acted upon by the deforming member 45, its pockets receive batches of ground coffee from the metering device 5, and the batches are acted upon by the two compacting or condensing tools 47 and 48.

Figure 2:
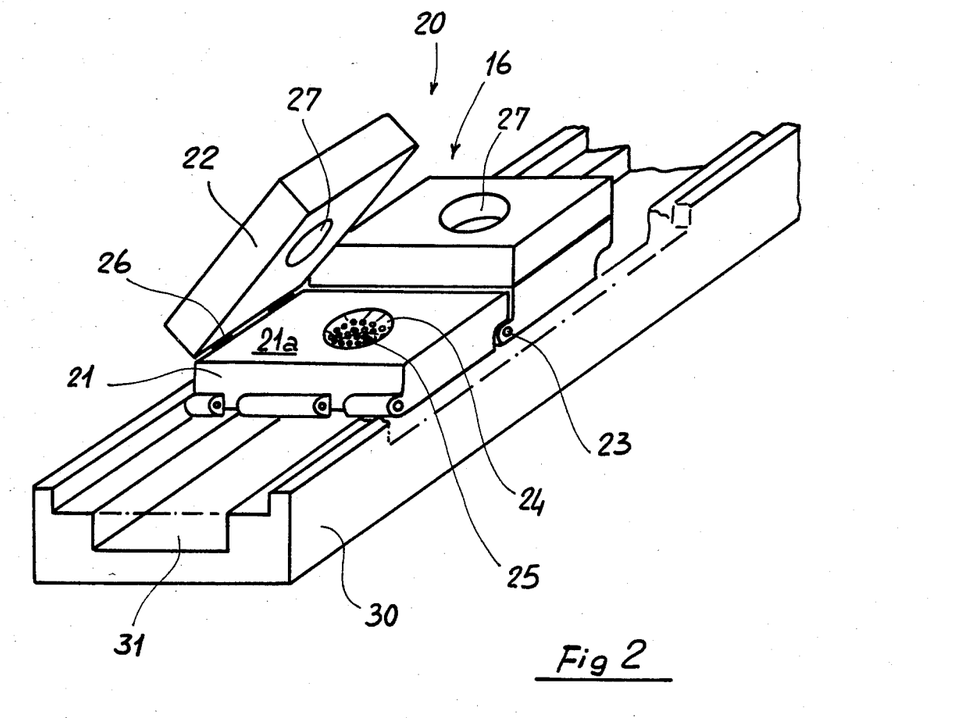
FIG. 2 is an enlarged fragmentary perspective view of the conveyor which transports the webs and the batches through the apparatus.
Figure 3:
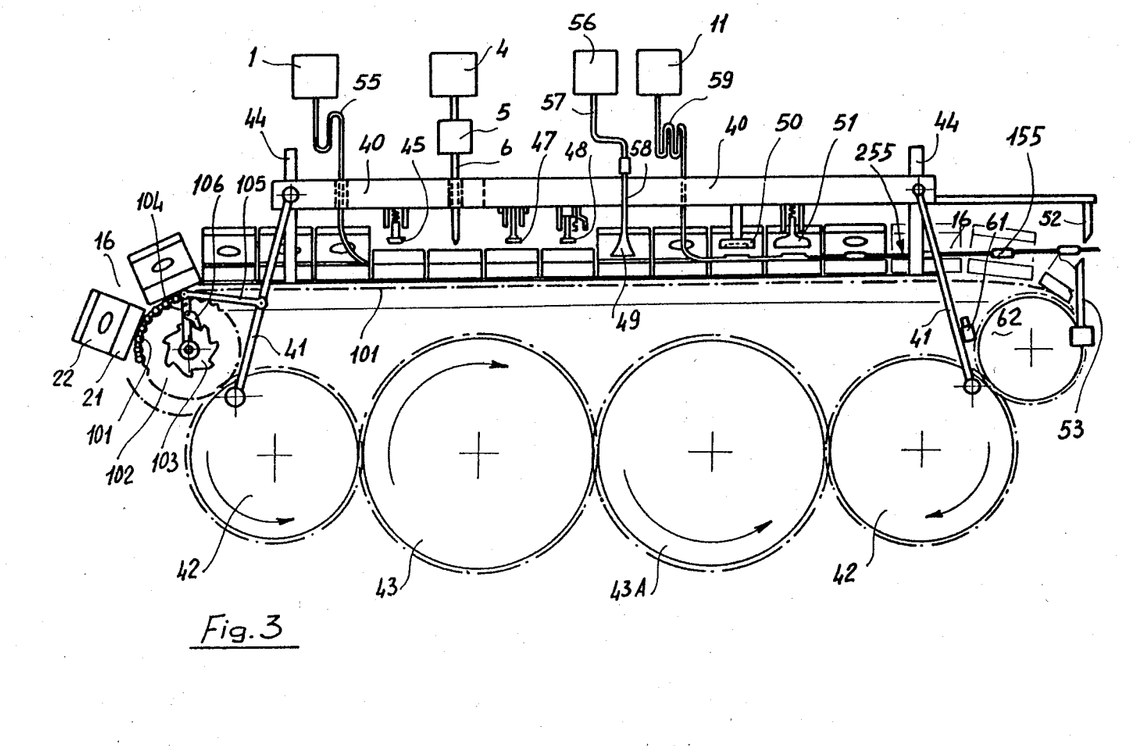
FIG. 3 is a schematic front elevational view of the apparatus, with the lower portion of the conveyor omitted.

As can be seen in FIG. 2, the upper (supporting) surface 21a of each inner plate 21 faces upwardly during travel with the upper reach 16a of the conveyor 16. FIG. 2 further shows that, in the illustrated embodiment, the surfaces 21a are provided with circular or substantially circular recesses 24 each of which communicates with a substantial number of suction ports 25. The suction ports 25 further communicate with a suction chamber 31 which is defined by a groove machined into the upper side of a horizontal guide or bed 30 for the inner plates 21 forming part of the upper reach 16a. To this end, the neighboring inner plates 21 overlap each other in such a way that they at least substantially seal the groove or suction chamber 31 from the surrounding atmosphere. This ensures that the suction generating device (e.g., a suction pump or a fan, not shown) which draws air from the groove 31 can adequately attract the downwardly bulging portions of the web 55 to the concave surfaces bounding the respective recesses 24 of the inner plates 21.

Each outer plate 22 has a substantially centrally located through opening 27 which is in register with the recess 24 of the respective inner plate 21 when the plate 22 overlies the plate 21 therebelow (portion B of the path section defined by the upper reach 16a of the conveyor 16). The diameter of each preferably circular opening 27 exceeds, at least slightly, the diameter of the respective recess 24.

FIG. 3 shows in greater detail the manner in which the vertically reciprocable carrier 40 is mounted in the frame of the improved apparatus. Each end portion of the carrier 40 is connected with two links 41 which are pivotable relative thereto about horizontal axes extending at right angles to the direction indicated by the arrow F1 and which are further articulately connected to eccentric pins of a driven gear 42. The left-hand gear 42 of FIG. 3 is in direct mesh with a driver gear 43 which receives torque from a suitable prime mover, not shown, and the right-hand gear 42 of FIG. 2 is driven by an intermediate gear 43A which mates with the driver gear 43. The diameters of the gears 42 are the same, and the diameters of the gears 43, 43A are also the same (but larger than the diameters of the gears 42). The driver gear 43 is preferably driven continuously by a variable-speed electric motor or the like. The gears 42 rotate at the same speed but in opposite directions; they cause the two pairs of links 41 to move the carrier 40 up and down, i.e., away from and toward the upper reach 16a of the conveyor 16.

The means for intermittently advancing the conveyor 16 derives motion from at least one of the left-hand links 41 of FIG. 3. Such one link 41 is articulately connected with a pair of links 104, 105. The link 104 carries a pawl 106 whose pallet can index a ratchet wheel 103 on the shaft of a sprocket wheel 102 for an endless chain 101 which is connected with and transmits motion to the conveyor 16. The exact manner in which the chain 101 is coupled to the inner plates 21 of the conveyor 16 is not shown in the drawing. It suffices to say that the movements of the carrier 40 are synchronized with the intermittent movements of the chain 16 to thus ensure that the carrier 40 descends and moves the devices which are mounted thereon into engagement with the web 55, batches 154 and/or web 59 while the conveyor 16 is at a standstill.

The carrier 40 is further mounted for movement along four upright guide members or columns 44 of which only two can be seen in FIG. 3. The columns 44 extend through suitably configurated holes in the respective portions of the carrier 44 so that the latter is compelled to move up and down without changing its orientation.

As mentioned above, the carrier 40 supports the deforming member 45 which is arranged to extend through the opening 27 of the outer plate 22 therebelow and to deform the corresponding portion of the first web 55 so that the latter is formed with a pocket whose convex underside conforms to the concave surface bounding the recess 24 in the corresponding inner plate 21.

The carrier 40 further supports the conveying system 6 which serves to admit metered quantities (batches) of ground coffee from the metering device 5 into successive pockets of the web 55. The conveying system 6 can extend through the opening 27 of the outer plate 22 therebelow, i.e., such outer plate 22 overlies the respective inner plate 21 during dwell at the station 7 of FIG. 1. The conveying system 6 delivers a batch of ground coffee particles while the respective plates 21, 22 are idle, i.e., during the intervals of dwell of the conveyor 16.

The carrier 40 also supports the first compacting tool 47 which is used for preliminary compacting of batches during the intervals of dwell of the conveyor 16. The working (lower) end of the tool 47 can extend through the opening 27 of the outer plate 22 therebelow (at the station 8 of FIG. 1).

Still further, the carrier 40 supports the aforementioned second or final compacting or condensing tool 48 which can subject the preliminarily condensed batch to a final condensing or compacting action so that the batch is converted into a cake 154 (FIG. 9) of coherent particles of ground coffee. The arrangement is preferably such that the tool 48 can subject the partially compacted batch to the action of a force in the range of 500 kg and that this tool is also rotatable about its vertical axis. Rotation of the tool 48 preferably begins when the force is reduced from 500 kg to approximately 130 kg. This will be explained in greater detail with reference to FIGS. 4 and 5.

The compacting tool 48 is followed (as considered in the direction of arrow F1) by the aforementioned nozzle 49 which is connected with a rigid pipe 58 installed in the carrier 40. As mentioned above, the purpose of the nozzle 49 is to clean up the freshly formed cake 154 and to remove particles of ground coffee from the area surrounding the cake.

The nozzle 49 is followed by the thermowelding (heat applying) device 50 which bonds the upper or outer web 59 to the adjacent portions of the web 55 around successive cakes 154 so as to convert the corresponding portions of the webs 55, 59 and the cake 154 therebetween into a strip 255 of coherent packets 155.

The carrier 40 further supports the aforementioned quality detector 51 which follows the device 50 and has or cooperates with conventional means for encoding information relating to the quality of the respective packet 155 on such packet or adjacent thereto. For example, the detector 51 can be designed to ascertain the dimensions of that portion of each packet 155 which contains the cake 154 and extends above the supporting surface 21a of the respective inner plate 21.

The carrier 40 also supports the upper severing implement 52 of the means for subdividing the continuous strip 255 into selected lengths or shorter strips each of which contains a predetermined number of packets 155. The implement 52 on the carrier 40 cooperates with the severing implement 53 which is mounted on a gear wheel 62 at the right-hand end turn of the conveyor 16. The severing operation of the implements 52, 53 can be controlled by a packet meter, not shown.

FIG. 3 further shows a suction generating device 56 which is connected with the discharge end of the rigid pipe 58 for the suction nozzle 49 by a preferably flexible conduit 57 so as to draw air into the intake (lower) end of the nozzle 49 and to thereby gather the particles of ground coffee which do not adhere to the cake 154 at the station 10 of FIG. 1.

The means for raising the outer plates 22 of the conveyor 16 in the regions A of the upper reach 16a and for causing or permitting the plates 22 to overlie the respective lower plates 21 in the region B of the upper reach 16a is not specifically shown in the drawing. Such means can comprise a suitably configured stationary cam which is tracked by roller followers on the outer plates 22.

Still further, FIG. 3 shows a braking device 61 which positively arrests the conveyor 16 when the pawl 106 moves in a counterclockwise direction, as viewed in FIG. 3, i.e., when it merely rides over the adjacent tooth or teeth of the ratchet wheel 102. The gear wheel 62 constitutes the right-hand sprocket wheel for the chain 101 which intermittently drives the conveyor 16. The purpose of the brake 61 is to ensure that the play between the neighboring inner plates 21 along the upper reach 16a of the conveyor 16 is eliminated when the conveyor 16 is brought to a standstill to thus enhance the accuracy of formation of packets 155. Relative movements between neighboring pairs 20 of plates 21, 22 could affect the appearance, dimensions and/or quality of the packets 155.

Figure 4:
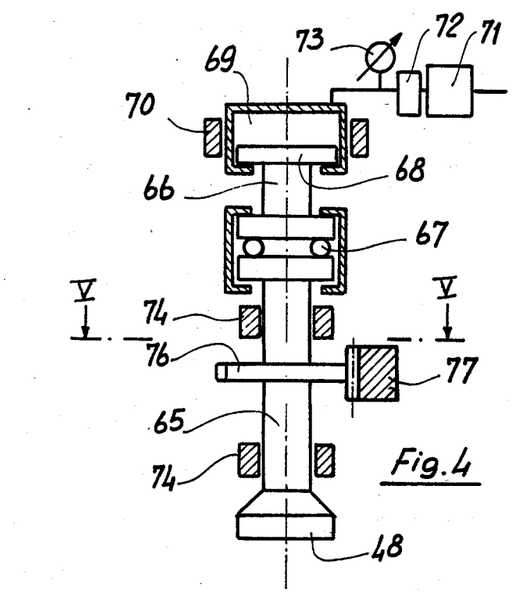
FIG. 4 is an enlarged fragmentary vertical sectional view of that portion of the apparatus which includes the second condensing tool for batches of ground coffee.
Figure 5:
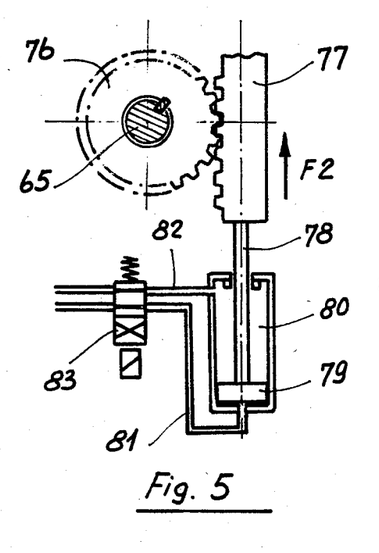
FIG. 5 is a horizontal sectional view as seen in the direction of arrows from the line V—V of FIG. 4.

The details of the means for controlling the second or final condensing or compacting tool 48 are shown in FIGS. 4 and 5. This tool is mounted at the lower end of a vertical shaft 65 which is rotatable in the bearings 74 of the carrier 40 and whose upper end is coupled (for movement up and down) with a second shaft 66 by a suitable thrust bearing 67. The latter allows the shaft 65 to rotate with reference to the shaft 66 but the shaft 65 is compelled to share all axial movements of the shaft 66. The upper end portion of the shaft 66 carries a piston 68 which is reciprocable in a cylinder 69 mounted in a portion 70 of the carrier 40. The upper chamber of the cylinder 69 can receive a pressurized fluid (e.g., compressed air) by way of a conduit which is connected to a source 71 of compressed air and contains an adjustable pressure regulating valve 72 as well as a pressure gauge 73.

The means for rotating the shaft 65 for the tool 48 comprises a pinion 76 which is coaxial with and affixed to the shaft 65 and meshes with a toothed rack 77 which is reciprocable in and counter to the direction indicated by the arrow F2. The shank 78 of the rack 77 is connected to a piston 79 in a double-acting cylinder 80 whose chambers are connectable with a source (not shown) of compressed fluid (e.g., air) by conduits 81, 82 containing a distributor valve 83.

The operation of the arrangement which is shown in FIGS. 4 and 5 is as follows:

When the carrier 40 is lifted above and away from the upper reach 16a of the conveyor 16, the piston 68 is located in the lowermost portion of the cylinder 69 and the pressure in the cylinder chamber above the piston 68 is maintained at a predetermined value. The carrier 40 thereupon begins to descend toward the upper reach 16a of the conveyor 16 (which is then at a standstill) so that the tool 48 engages and further compacts the pre-compacted batch of ground coffee in the pocket of the adjacent portion of the web 55. The piston 68 rises in the cylinder 69 as the carrier 40 continues to descend whereby the pressure in the chamber of the cylinder 69 rises to 500 kg and the tool 48 acts upon the batch therebelow with a force which is proportional to such pressure in the cylinder 69. The pressure in the cylinder 69 above the piston 68 can be adjusted by a valve 72 upon reading the position of the pointer of the gauge 73.

The tool 48 applies to the batch therebelow a maximum force when the carrier 40 reaches its lower end position. The carrier 40 begins to rise shortly thereafter and the pressure in the chamber of the cylinder 69 begins to decrease because the piston 68 is free to move downwardly with reference to the cylinder 69 and its holding means 70. At such time, the valve 83 admits compressed air into the conduit 81 so that the toothed rack 77 begins to move upwardly (as viewed in FIG. 5 and as indicated by the arrow F2) as soon as the force with which the tool 48 bears upon the cake of ground coffee therebelow decreases sufficiently to allow for rotation of the shaft 65 relative to the shaft 66 and the bearings 74. The arrangement may be such that, when the pressure in the cylinder 69 drops from 500 kg to approximately 130 kg, the rack 77 begins to move in response to the pressure of fluid which is admitted via conduit 81 and begins to rotate the shaft 65 through the medium of the pinion 76 whereby the rack 77 overcomes the friction between the underside of the tool 48 and the cake 154. The underside of the tool 48 then rotates relative to the top surface of the freshly formed cake 154 to ensure that such underside does not attract and retain any particles of ground coffee when the tool 48 begins to move upwardly and away from actual contact with the cake 154. The carrier 40 reaches the upper end of its stroke (and the tool 48 is then out of contact with the cake 154 therebelow) and initiates the admission of compressed air via conduit 82 so that the rack 77 begins to move downwardly, as viewed in FIG. 5, and reassumes its illustrated starting position. The position of the valve 83 can be (indirectly) changed by the piston 79 when the latter reaches the upper end of its stroke, as viewed in FIG. 5.

An advantage of the arrangement which is shown in FIGS. 4 and 5 is that the force with which the tool 48 is biased against the batch therebelow as well as the torque which the means 76, 77 applies to the shaft 65 for the tool 48 can be selected practically at will and can be varied within a desired range, for example, in such a way that the magnitude of transmitted torque decreases with decreasing magnitude of the force. It is possible to select the pressure in the lower chamber of the cylinder 80 in FIG. 5 in such a way that the tool 48 begins to rotate when the carrier 40 is held in the lower end position, i.e., when the magnitude of the force which is applied to the tool 48 in the axial direction of the shafts 66 and 65 reaches its maximum value. The underside of the tool 48 rotates relative to the compacted batch (cake 154) and is thus relieved of any solid particles which tend to adhere thereto. The torque transmitting means including the rack 77 and pinion 76 can be replaced with a rotary electromagnet or any other suitable means. The illustrated torque transmitting means is relatively simple, compact, reliable and inexpensive.

Figure 6:
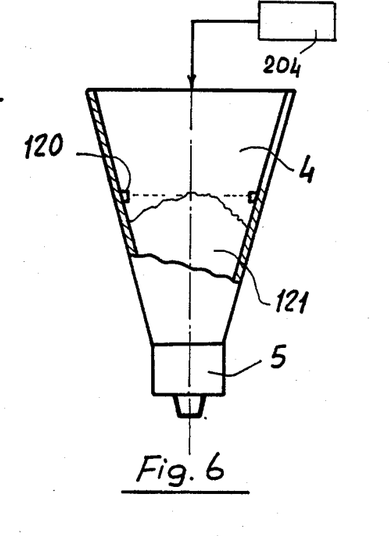
FIG. 6 is an enlarged partly elevational and partly sectional view of the source of ground coffee and of the means for replenishing the supply of ground coffee in the source.

FIG. 6 shows a funnel-shaped reservoir 4 for a supply 121 of ground coffee particles. A level detector 120 (e.g., a photoelectric cell) is provided to monitor the supply 121 of ground coffee in the reservoir 4 and to initiate the operation of a small coffee grinder 204 as soon as the supply 121 is depleted below a predetermined value. The grinder 204 then admits a metered quantity of freshly ground coffee into the reservoir 4. The arrangement is or can be such that a signal from the level detector 120 sets the grinder 204 in motion for a predetermined interval of time which is required to ensure that the supply 121 is replenished and the reservoir 4 can continue to deliver ground coffee to the metering device 5 at a highly predictable rate.

Figure 7:
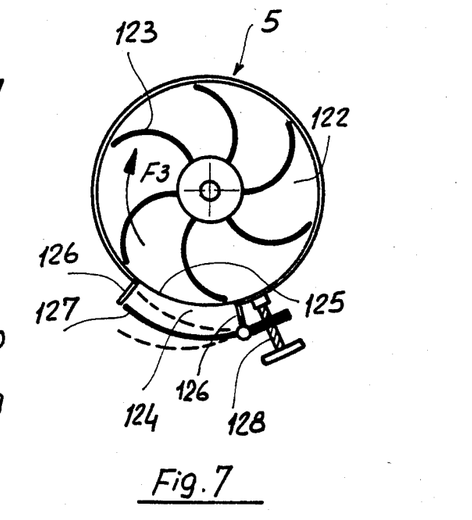
FIG. 7 is a plan view of the metering device which receives ground coffee from the source of FIG. 6.

The metering device 5 is set in operation to deliver a metered quantity (batch) of ground coffee via conveyor stream 6 when the conveyor 16 is at a standstill. As shown in FIG. 7, the metering device 5 comprises a container defining a chamber 122 for an intermittently rotatable wheel 123 with curved vanes or blades which move ground coffee into a compartment 124 bounded by two sidewalls 126 and receiving ground coffee through an aperture 125 in the wall of the container for the wheel 123. The compartment 124 can discharge its contents at a rate depending on the position of a gate 127 which is movable between a number of different positions. The positions of the gate 127 are adjustable by a micrometer screw 128 so as to enable the operator to vary the quantity of ground coffee in the batches which issue from the metering device 5 and descend via conveying system 6 into the pocket therebelow. The arrow F3 denotes the direction of rotation of the wheel 123. The quantity of coffee in a batch is determined by the length of the interval during which the wheel 123 rotates and by the selected position of the gate 127. The screw 128 allows for highly accurate selection of the quantities of ground coffee in the batches which are admitted into the pockets of the web 55 so that the difference between the optimum weight and the actual weight of the batohes does not exceed 0.1 gram.

Figures 8, 10:
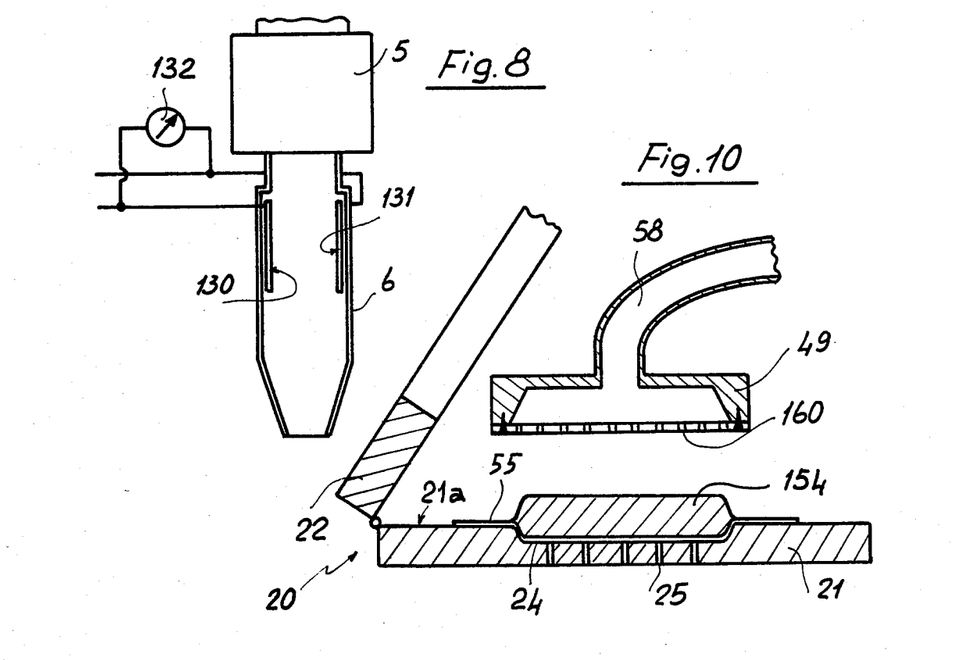
FIG. 8 is a schematic partly elevational and partly sectional view of means for conveying batches of ground coffee from the metering device of FIG. 7 into successive pockets of the first web in the apparatus of FIG. 3.
FIG. 10 is an enlarged vertical sectional view of means for gathering loose particles of ground coffee upon completion of the compacting operation.

FIG. 8 shows that the conveying system 6 comprises a duct which contains two electrodes 130, 131 in the form of plates for establishing and maintaining a potential difference which suffices to deionize the particles of ground coffee in the duct of the system 6 so that such particles do not tend to adhere to the internal surface of the duct but invariably descend into the pocket therebelow. Such neutralization of static electricity also contributes to predictability of the quantities of ground coffee particles in successive batches. The potential differences between the electrodes 130, 131 can be monitored by a voltmeter 132 which can be designed, or combined with means, to automatically change the potential difference if particles of ground coffee tend to accumulate along the internal surface of the duct forming part of the conveying system 6.

Figure 9:
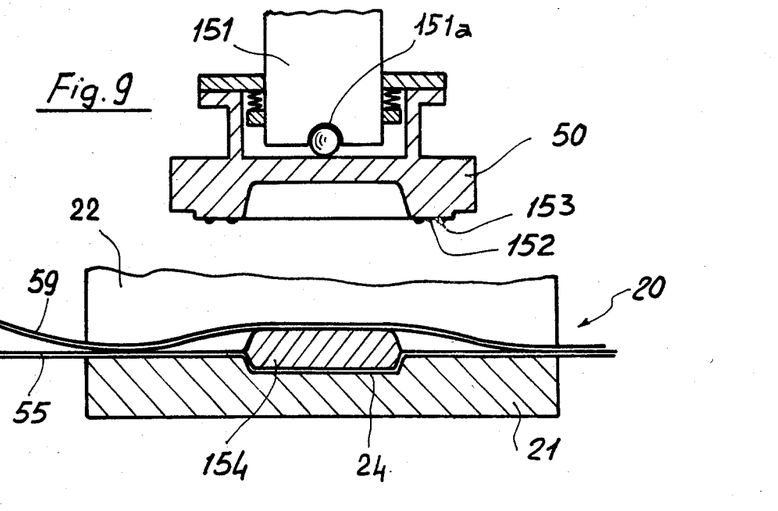
FIG. 9 is an enlarged vertical sectional view of the means for bonding the webs to each other around successive cakes of compacted ground coffee.

Referring to FIG. 9, there is shown the thermowelding station where the heated device 50 bonds selected portions of the web 59 to the adjacent portions of the web 55 so that the webs (and the compacted batch or cake 154 therebetween) for a packet 155. The device 50 is mounted at the lower end of a shaft 151 (which is affixed to and moves with the carrier 40) by a universal joint 151a here shown as a ball joint to allow the device 50 to change its orientation and to more predictably bond the adjacent portions of the webs 55 and 59 to each other by enabling its underside 152 to assume an inclination which is most likely to ensure the establishment of a highly satisfactory sealing action. The underside 152 of the device 50 has raised portions 153 which perform the actual bonding action and can form around the cake 154 two circles where the webs 55, 59 are actually bonded to each other. The plate 22 of the pair 20 below the shaft 151 is held in open position when the device 50 descends with the carrier 40 to form a packet 155. FIG. 9 further clearly shows how the material of the pocket in the web 55 hugs the concave surface of the respective recess 24. The suction ports 25 have been omitted in FIG. 9 for the sake of clarity.

FIG. 10 shows the details of the means at the station 10 of FIG. 1. The nozzle 49 has a perforated bottom wall 160 from which air is evacuated via pipe 58 when the suction generating device 56 of FIG. 3 is on. When the carrier 40 descends, the intake of the nozzle 49 moves nearer to the cake 154 therebelow and sucks up all loose particles of coffee from the exposed side of the cake 154 as well as from the surrounding surface of the web 55. This ensures that the apparatus will be able to form packets 155 each of which has a predetermined size and shape as well as that the area around each confined cake 154 will be properly sealed by the device 50 at the station 13 of FIG. 1.

An important advantage of the improved apparatus is its simplicity and compactness as well as its ability to form packets or pods 155 of highly predictable size and/or shape. Furthermore, the apparatus is less likely to contaminate the surrounding area with particles of ground coffee than heretofore known apparatus, and the density of cakes 154 is highly predictable and uniform. At the same time, the apparatus allows for rapid, convenient and accurate adjustment of the metering action, of the force with which the batches are compacted by the tool 48 as well as of the force which the toothed rack 77 must covercome in order to set the tool 48 in rotary motion. The provision of electrodes 130, 131 also contributes to more predictable formation of batches each of which contains the same quantity of ground coffee as the preceding or the nextfollowing batches until and unless the operator decides to change the metering action of the device 5 by rotating the screw 128. Still further, the apparatus can turn out large quantities of packets 155 per unit of time and the bond between the webs 55, 59 is more satisfactory than in heretofore known packets because the nozzle 49 gathers all loose particles of ground coffee before the web 59 is bonded to the web 55.

The information which is encoded on the strip 255 by (or in response to signals from) the detector 51 can also be used in the brewing machine which utilizes the packets 155.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. In an apparatus for making a strip of coherent packets containing batches of metered quantities of flowable solid material, particularly coffee, between overlapping first and second elongated webs at least one of which includes a liquid-permeable material, the combination of an endless conveyor comprising a series of mobile plates having supporting surfaces; means for intermittently advancing said conveyor in a predetermined direction along a predetermined path having a section wherein the supporting surfaces of said plate face upwardly; means for depositing successive increments of the first web on the supporting surfaces of successive plates in a first portion of said section; means for feeding batches onto the first web in a second portion of said section downstream of said first portion, as considered in said direction, during the intervals of dwell of said conveyor so that each batch is disposed above one of said supporting surfaces; means for densifying the batches in a third portion of said section downstream of said second portion during the intervals of dwell of said conveyor, including at least one rotary compacting tool, adjustable means for biasing said tool from above against the batch in the third portion of said section with a variable force, and means for rotating said tool while the latter is biased against the batch in said third portion; means for depositing successive increments of the second web onto the first web in a fourth portion of said section downstream of the third portion so that the second web overlies the batches on the first web; and means for bonding the first and second webs to each other around successive batches in a fifth portion of said section downstream of said fourth portion.

2. The combination of claim 1, wherein said rotating means includes an adjustable torque transmitting device arranged to transmit to said tool a progressively decreasing torque in response to decreasing force which said biasing means applies to said tool.

3. The combination of claim 1, wherein the webs contain heat-sealable materials and said bonding means includes means for applying heat to selected portions of the webs in said fifth portion of said section.

4. The combination of claim 3, wherein said heat applying means includes a welding member having raised portions arranged to bond said selected portions of the webs to each other.

5. The combination of claim 3, further comprising mobile carrier means for intermittently raising and lowering said heat applying means in synchronism with the operation of said advancing means.

6. The combination of claim 5, further comprising a universal joint interposed between said carrier means and said heat applying means.

7. The combination of claim 1, wherein said tool is arranged to condense successive batches into cakes of coherent solid particles and further comprising means for gathering those particles on successive plates which do not adhere to the respective cakes, said gathering means being adjacent to a sixth portion of said section between said third and fourth portions.

8. The combination of claim 7, wherein said gathering means includes a nozzle having an intake adjacent to said sixth portion and suction generating means arranged to draw air and non-adherent particles of successive batches through said intake.

9. The combination of claim 1, further comprising signal generating detector means for monitoring the quality of successive compacted batches.

10. The combination of claim 9, wherein said detector means is located in a seventh portion of said section downstream of said fifth portion and is arranged to monitor the shapes of those portions of the second web which overlie compacted batches.

11. The combination of claim 9, further comprising means for applying indicia to at least one of said webs in the region of a detected defective batch.

12. The combination of claim 1, wherein said feeding means comprises a source of flowable solid material, means for monitoring the supply of material in said source, and means for admitting additional material when the supply of material in said source is depleted below a predetermined value.

13. The combination of claim 1, wherein said feeding means comprises a source of flowable solid material, a metering device receiving material from said source, and means for conveying batches from said device onto the first web in said second portion of said section.

14. The combination of claim 13, wherein said metering device is adjustable and further comprising means for adjusting said metering device to thereby vary the quantity of material in the batches.

15. The combination of claim 1, wherein said feeding means comprises means for deionizing the particles of the batches before such particles reach the first web.

16. The combination of claim 1, wherein said feeding means comprises means for neutralizing the electrostatic charges of particles which advance toward the second portion of said section.

17. The combination of claim 1, wherein the plates of said conveyor are movable relative to each other, as considered in said direction, and further comprising means for causing such plates to move nearer to each other in the region of said section in response to stoppage of said conveyor.

18. The combination of claim 1, wherein said means for moving said plates nearer to each other comprises a brake for said conveyor.

19. The combination of claim 1, wherein said conveyor comprises additional plates, one for each of said mobile plates, and means for articulately connecting such additional plates to the respective mobile plates so that the additional plates are movable to and from positions of overlap with the supporting surfaces of said mobile plates.

20. The combination of claim 1, wherein said densifying means comprises a second tool which is disposed ahead of said rotary tool, as considered in said direction, and is arranged to effect preliminary compacting of successive batches.

* * * * *